US009153290B1

(12) United States Patent
Bandic et al.

(10) Patent No.: US 9,153,290 B1
(45) Date of Patent: Oct. 6, 2015

(54) INTRA-ZONE WEAR LEVELING FOR HEAT-ASSISTED MAGNETIC RECORDING—SHINGLED MAGNETIC RECORDING (HAMR-SMR) TYPE STORAGE DEVICES

(71) Applicant: HGST Netherlands B.V., Amsterdam (NL)

(72) Inventors: Zvonimir Z. Bandic, San Jose, CA (US); Luiz M. Franca-Neto, Sunnyvale, CA (US); Cyril Guyot, San Jose, CA (US); Adam C. Manzanares, San Jose, CA (US); Bruno Marchon, Palo Alto, CA (US); Erhard Schreck, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/603,046

(22) Filed: Jan. 22, 2015

(51) Int. Cl.
 *G11B 5/09* (2006.01)
 *G11B 27/36* (2006.01)

(52) U.S. Cl.
 CPC ...................... *G11B 27/36* (2013.01)

(58) Field of Classification Search
 CPC ........ G11B 27/36; G11B 5/012; G11B 20/18; G11B 5/00; G11B 2005/0221; G11B 27/3027; G11B 2220/90; G11B 5/5927; G11B 5/59655
 USPC ............. 360/77.08, 53, 55, 77.06, 59, 48, 31; 369/47.27, 53.22, 116
 See application file for complete search history.

(56) References Cited

U.S. PATENT DOCUMENTS

| | | | |
|---|---|---|---|
| 8,053,097 B2 | 11/2011 | Li et al. | |
| 8,233,359 B2 | 7/2012 | Iwata et al. | |
| 8,493,820 B1 | 7/2013 | Langlais et al. | |
| 8,867,153 B1 * | 10/2014 | Coker et al. | 360/31 |
| 2013/0314815 A1 | 11/2013 | Yuan et al. | |
| 2014/0140180 A1 | 5/2014 | Zhang et al. | |

FOREIGN PATENT DOCUMENTS

WO 2013138472 A1 9/2013

OTHER PUBLICATIONS

Yoon, "Nano-Tribology of Discrete Track Recording Media," Dissertation, Engineering Sciences, University of California San Diego, 2010, 233 pp. (Note: Applicant points out in accordance with MPEP 609.04(a) that the 2010 year of publication is sufficiently earlier than the effective U.S. filed and any foreign priority date of Jan. 22, 2015, so that the particular month of publication is not in issue.).
Zhang et al., "Improvement of Thermal Stability of the Lubricant Film for the Heat Assisted Magnetic Recording Media," J. Magn. Soc. Jpn., vol. 32(2), Jan. 2008, pp. 124-129.

* cited by examiner

*Primary Examiner* — Nabil Hindi
(74) *Attorney, Agent, or Firm* — Shumaker & Sieffert, P.A.

(57) ABSTRACT

A head-assisted magnetic recording-shingled magnetic recording (HAMR-SMR) type storage device is described that includes a control module and one or more magnetic recording layers partitioned into zones. The control module is configured to write initial data beginning at an initial logical address of a zone. The initial logical address of the zone corresponds to an initial physical address of the zone. Responsive to receiving a command from a host associated with the HAMR-SMR type storage device to reset the zone and write subsequent data, the control module is further configured to reset the initial logical address of the zone to a subsequent physical address of the zone, and after resetting the initial logical address, write the subsequent data beginning at the initial logical address of the zone.

20 Claims, 4 Drawing Sheets

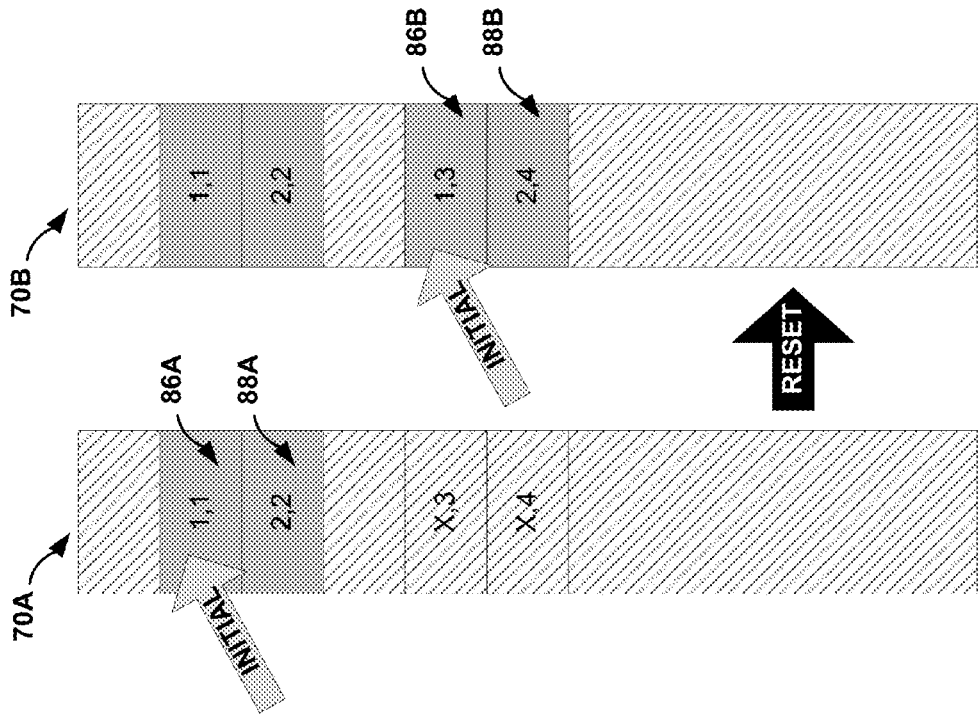
FIG. 4B
FIG. 4A
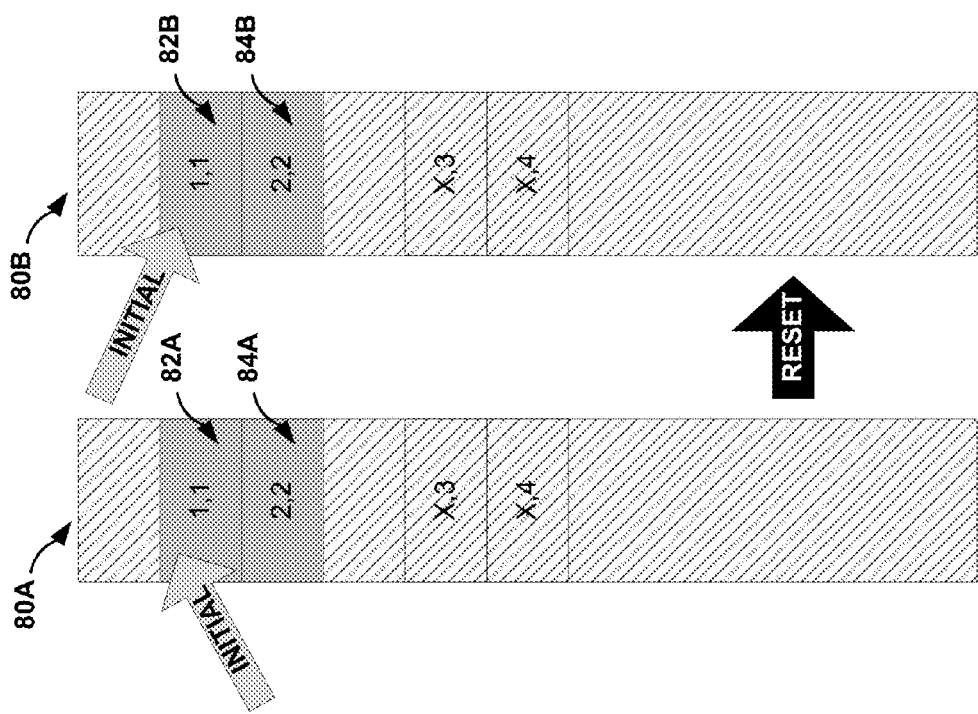
FIG. 3B
FIG. 3A

INTRA-ZONE WEAR LEVELING FOR HEAT-ASSISTED MAGNETIC RECORDING—SHINGLED MAGNETIC RECORDING (HAMR-SMR) TYPE STORAGE DEVICES

TECHNICAL FIELD

This disclosure relates generally to heat-assisted magnetic recording-shingled magnetic recording (HAMR-SMR) type storage devices.

BACKGROUND

Heat-assisted magnetic recording (HAMR), sometimes also called thermally-assisted recording (TAR), is a technique used by some magnetic recording storage devices for performing write operations at the magnetic recording layers of the hard disks. HAMR may increase the overall storage capacity of a storage device by enabling individual bits of data to be packed into much smaller, localized regions of the magnetic recording layer. For instance, to perform a write operation using HAMR, the storage device uses heat from a radiation source, such as a laser, to temporarily "spot heat", or otherwise increase the temperature at, a very small, localized region of the magnetic recording layer. By heating the localized region at, near, or above the respective Curie temperature of the localized region of the magnetic recording layer, the coercivity of the localized region reduces to enable the write operation to occur.

Some HAMR type storage devices also perform Shingled Magnetic Recording (SMR) techniques and are referred to as heat-assisted magnetic recording-shingled magnetic recording (HAMR-SMR) type storage devices. SMR involves the grouping of parallel tracks of the hard disk into multiple bands or zones. Some of the zones are "normal" and permit random reads and writes throughout the zone and other zones are "sequential" that can only be written sequentially. For sequential zones, the SMR type storage device maintains a write pointer that corresponds to a location within the zone for the next sequential write. To override the data stored at a sequentially written zone, a SMR type storage device may perform a "reset" of that entire zone. Upon a reset, the SRM type storage device adjusts the write pointer associated with the sequentially written zone so that the write pointer, and the location within the zone for the next sequential write, corresponds to the initial location of that zone.

Because each write operation using HAMR requires the heating of the magnetic recording layer of a hard disk, the areas of a hard disk of a HAMR-SMR type storage device that correspond to the initial regions of a sequentially written zone may undergo a disproportionate amount of heating. That is, each time a sequentially written zone of a HAMR-SMR type storage device is reset, the same localized regions of the hard disk that correspond to the initial regions of the zone will be written following every reset. Therefore, the regions of a hard disk of a HAMR-SMR type storage device that correspond to the initial regions of a sequentially written zone may more frequently be exposed to heat from HAMR and may wear out more quickly.

SUMMARY

In some examples, the disclosure describes a method including writing, by a control module of a heat-assisted magnetic recording-shingled magnetic recording (HAMR-SMR) type storage device, initial data, wherein the initial data is written beginning at an initial logical address of a zone of a recording layer of the HAMR-SMR type storage device, wherein the initial logical address to an initial physical address of the zone. The method further includes responsive to receiving a command from a host associated with the HAMR-SMR type storage device to reset the zone and write subsequent data: resetting, by the control module, the initial logical address of the zone to a subsequent physical address of the zone; and after resetting the initial logical address, writing, by the control module, the subsequent data beginning at the initial logical address of the zone.

In some examples, the disclosure describes a heat-assisted magnetic recording-shingled magnetic recording (HAMR-SMR) type storage device comprising: a plurality of magnetic recording layers partitioned into one or more zones; an arm assembly that includes a head configured to write and read data at each of the one or more zones using HAMR techniques; and a control module. The control module includes at least one processor configured to: receive initial data from a host; write the initial data beginning at an initial logical address of a particular zone of the one or more zones, wherein the initial logical address corresponds to an initial physical address of the particular zone. The control module being further configured to responsive to receiving a command from the host to reset the zone and write subsequent data: reset the initial logical address of the particular zone to a subsequent physical address of the particular zone; and after resetting the initial logical address, write the subsequent data beginning at the initial logical address of the particular zone.

In some examples, the disclosure describes a system including means for writing initial data beginning at an initial logical address of a zone of a magnetic recording layer of a heat-assisted magnetic recording-shingled magnetic recording (HAMR-SMR) type storage device, wherein the initial logical block address corresponds to an initial physical address of the zone and means for receiving a command from a host associated with the HAMR-SMR type storage device to reset the zone and write subsequent data. The system further includes means for responsive to receiving the command: resetting the initial logical block address of the zone to a subsequent physical address of the zone; and writing the subsequent data beginning at the initial logical block address of the zone after resetting the initial logical address.

The details of one or more examples are set forth in the accompanying drawings and the description below. Other features, objects, and advantages will be apparent from the description and drawings, and from the claims.

BRIEF DESCRIPTION OF DRAWINGS

FIGS. 3A and 3B are conceptual diagrams that illustrate a zone of a typical HAMR-SMR type storage device before and after a reset operation of the zone.

FIGS. 4A and 4B are conceptual diagrams that illustrate a zone of the example HAMR-SMR type storage device before and after a reset operation of the zone, in accordance with techniques of this disclosure.

DETAILED DESCRIPTION

Figure 1:
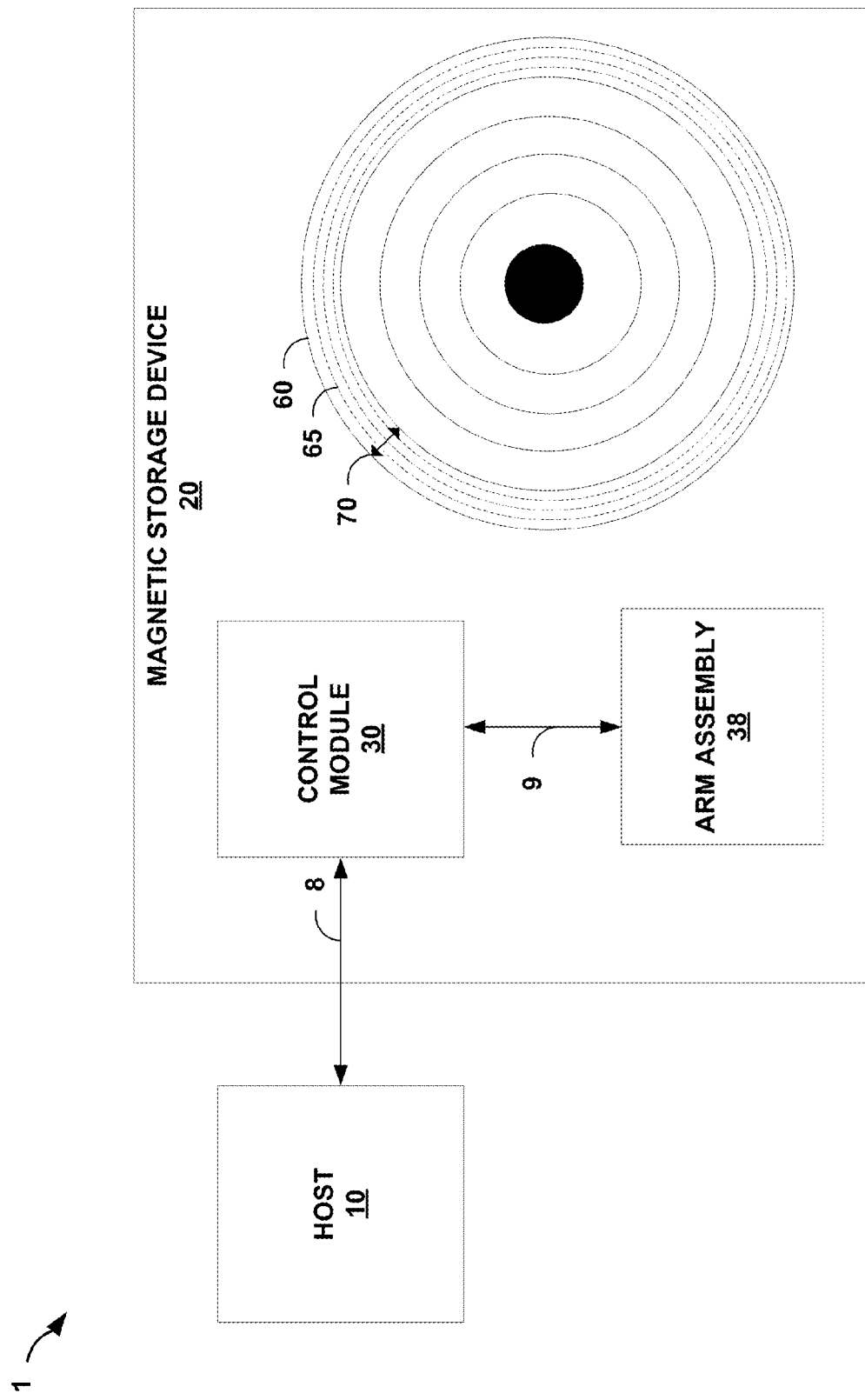
FIG. 1 is a conceptual of a system including a host and an example heat-assisted magnetic recording-shingled magnetic recording (HAMR-SMR) type storage device.

The disclosure describes techniques for reducing damage to areas of a hard disk of a heat-assisted magnetic recording shingled magnetic recording (HAMR-SMR) type storage device by reducing the frequency with which the areas of a hard disk that correspond to initial locations of a sequentially written zone are exposed to heat from HAMR. A HAMR-SMR type storage device may subdivide each respective platter or "magnetic recording layer" of a cylinder of a hard disk into "bands" or "zones" (referred to simply as "zones") that are associated with a group of sequential logical block addresses (LBA). Each zone may correspond to multiple parallel tracks located in one physical area of a single platter and each logical address of a particular zone may have a unique physical address that corresponds to a small localized region of the area of platter that is associated with that particular zone. While some zones may be "normal" zones that permit random reads and writes throughout the zone, some so-called "sequentially written zones" can only be written sequentially. The HAMR-SMR type storage device maintains a write pointer associated with each sequentially written zone that corresponds to a location within the zone for the next, sequential write. For the sake of brevity, the term "zone" or "band" as used throughout this disclosure refers to a "sequentially written zone".

A host may issue one or more write commands that cause the HAMR-SMR type storage device to record (i.e., write) information (i.e., data), sequentially, beginning at an initial logical address associated with a particular zone. Each time the HAMR-SMR type storage device writes data to a logical address of a zone, the HAMR-SMR type storage device spot heats the small localized region of the platter that corresponds to the logical and physical address where data is being written. The storage device heats the small localized region to a temperature that is at, near, or above the respective Curie temperature of the localized region, so that the coercivity of the localized region reduces sufficiently enough to enable the write operation to occur.

Eventually, the host may command the HAMR-SMR type storage device to "reset" the write pointer of a zone, or in other words, to configure the zone so that subsequent writes will override the data that was previously recorded at the zone. Upon reset, the HAMR-SMR type storage device adjusts the write pointer of the zone to point the initial logical address of the zone. However, rather than cause the write pointer to also point to the same, initial physical address of the zone the storage device will assign a new physical address within the zone to be the new initial physical address of the zone. For example, the new physical address may correspond to the physical address that the write pointer pointed to prior to the reset. In this way, following a reset of a zone, rather than begin writing to the initial locations of a zone by spot heating the same localized regions of a platter, the storage device reassigns the initial physical locations of a zone to be different physical locations of the zone and spot heats different localized regions of the platter than those localized regions that were previously heated.

FIG. 1 is a conceptual diagram of a system including a host and an example heat-assisted magnetic recording (HAMR) type storage device. System 1 includes host 10 in direct communication with magnetic storage device 20 (referred to simply as "storage device 20").

Host 10 represents one or more processors, computing devices, or computing systems that are configured to read data from and write data to a magnetic recording device, such as storage device 20. Host 10 may send commands, via link 8, that cause storage device 20 to record or retrieve data. For example, host 10 may issue one or more read commands that cause storage device 20 to return data stored at a particular logical address associated with storage device 20. Conversely, host 10 may issue one or more write commands that cause storage device 20 to record data specified by host 10 at a specific logical address associated with storage device 20.

Storage device 20 represents a host-driven, HAMR-SMR type storage device and represents any magnetic recording device that is configured to perform HAMR type recording techniques in conjunction with shingled magnetic recording (SMR) techniques. Storage device 20 includes control module 30, arm assembly 38, and platter 60. Storage device 20 may include more or fewer components than those shown. For example, storage device 20 typically includes one or more drive motors and other components that storage device 20 relies on to rotate platter 60 and to perform other operations associated with magnetic recording techniques.

Storage device 20 includes platter 60, which represents a single disk surface. While only a single platter 60 having a single disk surface is shown in FIG. 1, storage device 20 may include multiple platter 60 in a stacked arrangement that may form a cylinder-like shape and each platter 60 may have multiple disk surfaces used for storing data. Platter 60 represents an individual recording layer of storage device 20 that is subdivided into individual, radially-spaced tracks 65.

Although depicted as continuous tracks of magnetizable material, in some examples, tracks 65 may include bit-patterned-media (BPM) made up of many discrete data islands that serve as the recording layer of platter 60. To manage disk space, and in accordance with SMR techniques, storage device 20 may logically group two or more tracks 65 together into bands or zones 70 of logical block addresses (LBAs). The terms "band" and "zone" are used interchangeably throughout this disclosure to refer to a grouping of two or more tracks that are grouped together to represent multiple blocks of data that each have a corresponding LBA.

Each of zones 70 is a "sequential zones". That is, because storage device 20 is SMR based, storage device 20 includes both "normal" zones and permits random reads and writes throughout those normal zones and also includes "sequential zones" that can only be written sequentially. Each of zones 70 is a sequential zone.

Being that each of zones 70 is a sequential zone, for each of zones 70, storage device 20 maintains a write pointer that corresponds to a logical and physical location within that zone for the next, sequential write. To override the data stored at any of zones 70, storage device may perform a "reset" of that entire zone. Upon a reset, storage device 20 adjusts the write pointer associated that zone so that the write pointer, and the logical location within the zone for the next, sequential write, corresponds to the initial logical location of that zone. Unlike other HAMR-SMR type storage devices, as is described in more detail below, storage device 20 "Intra-Band Wear Leveling" techniques. That is, storage device 20 refrains from resetting the write pointer of one of zones 70, upon reset of that zone, to the same initial physical address of that zone each time and instead assigns the write pointer to a different physical address of the zone that is at a different localized region of platter 60 than the region of platter 60 that was last written.

Arm assembly 38 of hard storage device 20 includes the actuator, actuator arm, and head of storage device 20 that control module 30 uses to alter and interpret data stored by platter 60 (e.g., the physical, magnetic recording layers of storage device 20) when reading and writing data. Arm assembly 38 may include one or more actuator arms and attached to each actuator arm, may include a corresponding head-suspension assembly that carries a head carrier (e.g., an air-bearing slider). Attached to the one or more actuator arms, arm assembly 38 may further include an arm electronics (AE)

module that controls the actuator arms in response to commands from control module 30.

The head-suspension assembly of arm assembly 38 may permit the head carrier to be maintained very close to the surface of platter 60 and may further enable the head carrier to "pitch" and "roll" as platter 60 rotates. The head carrier has a HAMR head which includes a magneto-resistive "read head," an inductive "write head," a near-field transducer (NFT), and an optical waveguide. The head carrier, or the suspension arm, may support a semiconductor laser diode configured as the HAMR light source. As platter 60 rotates, the movement of the actuator of arm assembly 38 may enable the HAMR head to access different individual tracks 65.

Whether writing data to, or reading data from, platter 60, arm assembly 38 may receive, via link 9, command and control signals from control module 30 and may output, via link 9, data that has been retrieved. To execute the operation specified by control module 30, arm assembly 38 causes platter 60 to rotate and the components of arm assembly 38 to record or retrieve data stored at platter 60.

For example, when performing a write operation, arm assembly 38 may receive, from control module 30 via link 9, an indication of the information (i.e., data) to be recorded, and the physical locations of platter 60 that specify where the data is to be written. The write head of arm assembly 38 may magnetize the physical recording layer of platter 60 and the laser diode of arm assembly 38 may heat the magnetized area to change the magnetization of the area and record the specified data at the specified physical location.

Conversely, when reading data from platter 60, arm assembly 38 may receive, from control module 30 via link 9, an indication of the physical locations of platter 60 from which the data is to be retrieved. The read head of arm assembly 38 may sense the magnetic fields associated with the physical recording layer of platter 60 so that control module 30 can interpret the data at the specified physical location as bits of (e.g., logical zeros or ones).

Control module 30 can comprise any suitable arrangement of hardware, software, firmware or combination thereof which is configured to control arm assembly 38 to perform, at the request of host 10, read and write operations of the data stored at platter 60. For example, control module 30 may include any one or more microprocessors, digital signal processors (DSPs), application specific integrated circuits (ASICs), field programmable gate arrays (FPGAs), or any other equivalent integrated or discrete logic circuitry, as well as any combinations of such components. When control module 30 includes software or firmware, control module 30 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components. Although not shown in FIG. 1, control module 30 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to control module 30 and/or storage device 20, e.g., may be external to a package in which control module 30 and/or storage device 20 is housed.

Control module 30 may communicate with host 10 via link 8. For example control module 30 may receive various commands from host 10 to perform read and/or write operations on data stored at platter 60. Control module 30 may receive, via link 8 and from host 10, a request to write data, as well as an indication of the data and the logical address of platter 60 at which the data is to be written. In response to the write request, control module 30 may control arm assembly 38 to record the data received from host 10 at the physical address that corresponds to the logical address specified by the request. Conversely, control module 30 may receive, via link 8 and from host 10, a request to read data, as well as an indication of the logical location of platter 60 from which to read the data. In response to the read request, control module 30 may control arm assembly 38 so as to retrieve and transmit to host 10, the data stored at the physical location specified by the logical location specified by the request.

Control module 30 may maintain a memory or logic (e.g., a table, etc.) that defines how storage device 20 groups each of tracks 65 of platter 60 into LBA bands or zones 70 and further, logic or memory that defines various locations within each zone. In other words, control module 30 may store information or maintain logic that enables control module 30 to translate a logical address used when communicating with host 10 into a specific physical address of one of zones 70 that control module 30 uses when communicating with arm assembly 38.

Control module 30 may define that each of zones 70 have a lower bound, defined by an initial physical and logical address, and an upper bound, defined by a maximum physical and logical address. Control module 30 may maintain a memory pointer (e.g., a write pointer) or other logic that indicates which of the physical and/or logical locations within each of zones 70 is the next available physical and/or logical location that can be written. In some examples, control module 30 may maintain a memory pointer or logic that indicates which of the physical and/or logical locations within each of zones 70 was the last physical and/or logical location that was written. Control module 30 may maintain other types of data and memory pointers for use in maintaining the data stored by platter 60.

Control module 30 may ensure that all writes to each of zones 70 occur sequentially within each zone. For example, because storage device 20 is a HAMR-SMR storage device, when host 10 commands control module 30 to write data to one of (sequential) zones 70, control module 30 may configure platter 60 to write the data beginning first at the initial logical address of the zone and continue by writing any subsequent data, to sequential logical addresses of the zone. For subsequent write operations at the zone, control module 30 may write any data needing to be written beginning at the next available physical location that immediately follows, sequentially, the most recent physical location that was written.

In accordance with the techniques and circuits described herein, control module 30 may interact with host 10 and arm assembly 38 so as to configure storage device 20 to perform so called "Intra-Band Wear Leveling" techniques. That is, following a reset of a zone, rather than spot heating the same localized regions of platter 60 whenever the initial logical address of a particular zone 70 is being written to, control module 30 causes storage device 20 to assign a new physical address (i.e., new localized region of platter 60) to be the initial logical address of that particular zone 70 so that subsequent HAMR operations that begin at the initial logical address of that particular zone 70 occur beginning from the new physical address of the zone.

For example, host 10 may issue a write command across link 8 to control module 30 to cause storage device 20 to record some data beginning at an initial logical address (e.g., "0x000") associated with zone "A" of zones 70. Control module 30 may rely on the write pointer associated with zone "A" to determine that the logical address "0x000" of zone "A" corresponds to physical address "0x000" of zone "A" and command arm assembly 38 to record, using HAMR techniques, the data specified host 10 beginning at physical address "0x000" of zone "A". Control module 30 may increment the write pointer of zone "A" so that subsequent write operations are performed, sequentially, at the next available location of zone "A".

Host 10 may issue one or more subsequent write commands to cause control module 30 to record additional data at logical addresses 0x001 through 0x011 of zone "A". In other words, in a series of one or more write commands received from host 10, control module 30 causes storage device 10 to record data at each of logical addresses 0x000 through 0x011 of zone "A" which means that the data has been written to each of physical addresses 0x000 through 0x011 of zone "A". After this series of write operations, the write pointer associated with zone "A" may correspond to logical address and physical address 0x100 (e.g., the next available address that follows address 0x011).

Each time data is written to a logical address, storage device 20 spot heats the small localized region of platter 60 that corresponds to the physical addresses that are being written. In this example, after writing to each of logical addresses 0x000 through 0x011 of zone "A", storage device 20 will have heated each of the small localized regions associated with physical addresses 0x000 through 0x0011 of zone "A", to a temperature that is at, near, or above its respective Curie temperature, so that the coercivity of each of the localized regions is sufficiently reduced to enable the write operation to occur.

Host 10 may issue a reset and subsequent write command to configure storage device 20 to reset zone "A" and so that new data can be written to the beginning of zone "A" and override the data previously written at zone "A". Responsive to receiving the command from host 10 to reset zone "A" and write subsequent data, control module 30 may perform at least two operations.

First, control module 30 may reset the initial logical block address of zone "A" to a subsequent physical address of the zone. In other words, unlike some other types of storage devices, control module 30 may cause storage device 20 to refrain from reusing the same physical address of a zone as its corresponding initial logical location. Instead, control module 30 may assign the initial logical address of the zone to a different, subsequent physical address that was not recently written. In this example, control module 30 may assign logical address 0x000 of zone "A" with physical address 0x100 of zone "A". For example, control module 30 may adjust write pointer of zone A so that the write pointer corresponds to logical address 0x000 of zone "A" as well as physical address 0x100 of zone "A". Second, control module 30 may write the subsequent data received from host 10 beginning at the initial logical block address 0x000 of zone "A" by causing arm assembly 38 to record the subsequent data beginning at physical address 0x100 of zone "A."

In this way, control module 30 configures storage device 20 to perform so called "Intra-Band Wear Leveling" techniques. That is, rather than spot heat the same localized regions of platter 60 that were previously written to when zone "A" was last written to, control module 30 of storage device 20 will assign a new physical address to the initial logical address of sequential zone "A". This enables storage device 20 to perform, following a reset of one of zones 70, write operations that begin sequentially at the same initial logical address of the zone and a different physical address of the zone and different localized regions of platter 60.

Through "Intra-Band Wear Leveling" techniques, storage device 20 seemingly distributes the spot heating associated with HAMR across more regions of platter 60 by varying which physical addresses of a zone corresponds to the initial logical addresses of that particular zone following reset. Each time HAMR is performed at the initial logical addresses of a zone after reset, storage device 20 records and spot heats beginning from a different localized region of the zone.

Accordingly, storage 20 may benefit from the increase in overall storage density attributed to HAMR-SMR without being damaged from excessive heat exposure if, over time, the same logical addresses are repeatedly being written. Storage device 20 may automatically perform the techniques described herein in such a way that does not interfere with the operations of host 10. In other words, these techniques may be "transparent" to host 10 such that host 10 may benefit from these "Intra-Band Wear Leveling" techniques without having to alter its operation. Host 10 can continue to repeatedly write to the same initial logical addresses of a zone and reset a zone, and storage device 20 will automatically perform the described techniques to prevent these repeated resets and subsequent writes from damaging and decreasing the life expectancy of platter 60.

Figure 2:
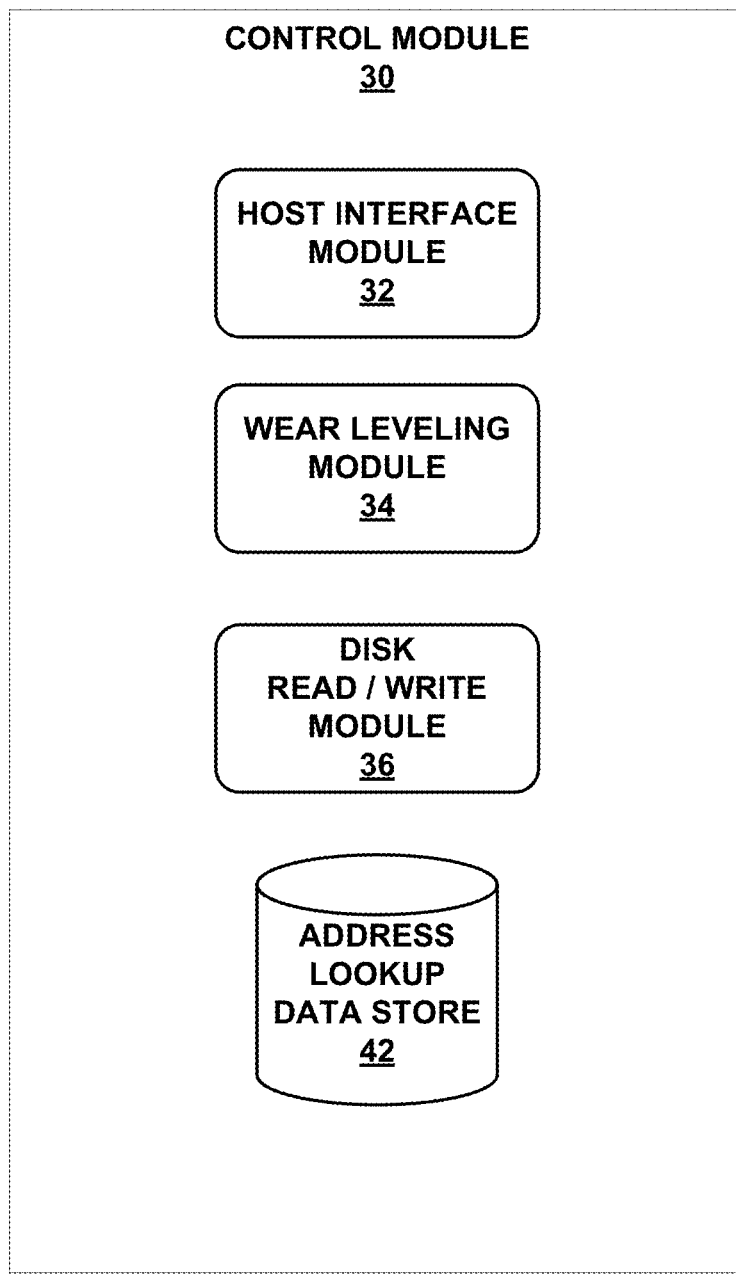
FIG. 2 is a block diagram illustrating details of an example control module of the example HAMR-SMR type storage device.

FIG. 2 is a block diagram illustrating details control module 30 of storage device 20. Control module 30 is described below with respect to storage device 20 and system 1 of FIG. 1.

Control module 30 includes host interface module 32, wear leveling module 34, and disk read/write (DRW) module 36. Control module 30 further includes address lookup data store 42. Modules 32, 34, and 36 may perform operations described using software, hardware, firmware, or a mixture of hardware, software, and firmware residing in and/or executing at control module 30. Control module 30 may execute modules 32, 34, and 36 using one or multiple processors. Control module 30 may execute modules 32, 34, and 36 as a virtual machine executing on underlying hardware associated with storage device 20.

Address lookup data store 42 represents any suitable storage medium for information that control module 30 uses to associate a logical address of storage device 20 with an actual, physical address of storage device 20. For example, data store 42 may organize information in a table or graph format. Data store 42 may receive an indication of a logical address as an input and in response, output a corresponding physical address. Conversely, data store 42 may receive an indication of a physical address as an input and in response, output a corresponding logical address. Data store 42 may store other information related to the management and organization of the data stored by storage device 20. For example, data store 42 may retain one or more memory pointers to initial physical and/or initial logical locations within LBA bands or zones of storage device 20.

Data store 42 may retain one or more memory pointers to maximum physical and/or maximum logical locations within LBA bands or zones of storage device 20. Data store 42 may retain one or more memory pointers (e.g., write pointers) to next-available physical and/or next-available logical locations within LBA bands or zones of storage device 20. Data store 42 may retain one or more memory pointers to most recently written to physical and/or logical locations within LBA bands or zones of storage device 20. Data store 42 may retain one or more other types of memory pointers that storage device 20 uses to perform HAMR and SMR techniques.

DRW module 36 communicates with arm assembly 38 to record or retrieve data at or from physical locations of platter 60. DRW module 36 acts as the interface by which host interface module 32 interacts with arm assembly 38 and platter 60. DRW module 36 may receive as input a physical location or range of physical locations associated with platter 60. In case of a write command received from host interface module 32, DRW module 36 may receive an indication of data to be recorded at the physical location or range of physical locations associated with platter 60. In case of a read command received from host interface module 32, DRW module 36 may output an indication of data retrieved from the physical location or range of physical locations associated with platter 60.

Host interface module 32 is configured to interpret and respond to commands and request from host 10. Host interface module 32 may receive a write command from host 10, and interpret the write command as having an indication of data to be written at a specific logical address or group of logical addresses of storage device 20. Host interface module 32 may invoke wear leveling module 34 to determine a physical address that corresponds to a logical address received from host 10 and then invoke DRW module 36 to record the data received from host 10 at the physical address returned by wear leveling module 34.

Host interface module 32 may receive a read command from host 10, and interpret the read command as having an indication a specific logical address or group of logical addresses of storage device 20. Host interface module 32 may invoke wear leveling module 34 to determine a physical address that corresponds to a logical address received from host 10 and then invoke DRW module 36 to retrieve the data stored at the physical address returned by wear leveling module 34 in order to output the data to host 10.

Wear leveling module 34 maintains the information stored at data store 42 on behalf of control module 30 and host interface module 32. Control module 30 relies on wear leveling module 34 to convert a logical address received from host 10 to a physical address recognizable by DRW module 36, and visa versa. For example, wear leveling module 34 may perform a look-up of a logical address provided from host interface module 32 to identify a physical location and/or zone associated with platter 60.

Wear leveling module 34 may maintain the one or more memory pointers stored at data store 42 that point to respective minimum and maximum physical and/or logical locations of each of the LBA bands or zones 70 of storage device 20. In other words, wear leveling module 34 may use memory pointers to store the logical and physical metes and bounds of each of zones 70. As is described below in further detail, unlike other storage devices, the minimum physical location of each of the LBA bands or zones 70 of storage device 20 does not necessarily correspond to the initial logical location of that zone.

Wear leveling module 34 may maintain the one or more memory pointers stored at data store 42 that point to next-available physical and/or next-available logical locations within the LBA bands or zones of storage device 20. Said differently, control module 30 also relies on wear leveling module 34 to maintain the information associated with the respective write pointer of each of zones 70. Wear leveling module 34 may rely on memory pointers to maintain the logical and physical location of the next available logical and/or physical location within each of zones 70 of platter 60 at which data can be recorded.

In some examples, wear leveling module 34 may maintain one or more memory pointers stored at data store 42 that point to most recently written to physical and/or logical locations within the LBA bands or zones of storage device 20. Said differently, wear leveling module 34 may rely on memory pointers to maintain the logical and physical location of the last unavailable logical and/or physical location within each of zones 70 of platter 60 at which data cannot recorded.

Wear leveling module 34 may maintain one or more memory pointers stored at data store 42 that point to a respective, initial physical location of each LBA bands or zones 70 of storage device 20. In other words, wear leveling module 34 may store, at data store 42, an indication of the exact physical location within platter 60 where the data stored at the initial logical location of each of zones 70 is stored.

Unlike other HAMR-SMR type storage devices, the initial physical location of each of the LBA bands or zones 70 of storage device 20 does not necessarily correspond to the minimum physical location of that zone. In order to prevent repeated resets of zones 70, and resultant subsequent HAMR operations beginning at the initial logical addresses of a zone from occurring too frequently at the same physical locations of a zones, wear leveling module 34 may modify and adjust the information stored at data store 42 so that the initial logical locations of zones 70 do not always correspond to the same physical addresses of platter 60.

For example, wear leveling module 34 may receive a reset command from host interface module 32 in response to a request from host 10 to reset one of zones 70 in anticipation of performing subsequent write operations starting at the initial logical location of that zone. In response to the reset command, wear leveling module 34 may determine, based on the next-available physical location pointer and/or the most recently written to physical location pointer, a new physical location of the zone to associate with the initial logical location of the zone. Wear leveling module 34 may use this new initial, physical location pointer to subsequently translate logical addresses received from host 10 into physical addresses at which to store and retrieve data from.

In this way, the subsequent write operations that occur after the zone has been "reset" still occur within the designated zone, but they do not necessarily occur at the same physical location of the zone that they would otherwise have occur at before the reset.

FIGS. 3A and 3B are conceptual diagrams that illustrate a zone of a typical HAMR-SMR type storage device before and after a reset operation of the zone. In contrast to FIGS. 3A and 3B, FIGS. 4A and 4B are conceptual diagrams that illustrate a zone of storage device 20 before and after a similar reset operation of the zone, in accordance with techniques of this disclosure. FIGS. 3A, 3B, 4A, and 4B are described below within the context of control module 30 of FIG. 2 and system 1 of FIG. 1.

FIGS. 3A and 3B, together, show a zone of a typical HAMR-SMR type storage device before and after a reset of the zone. Some storage devices, such as HAMR-SMR drives, require that all write operations being performed at a given zone occur sequentially. That is, when data is written to a zone, the initial portion of the data is written at the start or initial physical address of the zone and the intermediate portions of the data sequentially fill in the physical locations that follow the initial physical address of the zone. A zone can continue to be sequentially written with data in this way, until a last or maximum location of the zone is written.

For example, FIG. 3A shows zone 80A of a typical hard disk. Zone 80A includes data elements 82A and 84A. FIG. 3A illustrates that at an initial point in time, data element 82A was written at the initial logical and physical address (1, 1) of zone 80A. Following the write to the initial logical and physical address (1, 1), data element 84A was written at a subsequent logical and physical address (2, 2).

Eventually, a zone may be reset to override the old data and/or to make room for new data to be written at the zone. Following a reset, any data previously written to the zone will no longer be accessible and new data may be written to the zone. After a reset, the initial portion of the new data is written sequentially beginning at the start or initial physical address of the zone and the intermediate portions of the new data sequentially fill the physical locations that follow the initial physical address of the zone.

For example, FIG. 3B shows zone 80B, which corresponds to zone 80A after a reset operation has been performed. At some point in time, after data element 84A was written to zone 8A, a host, such as host 10, may cause a reset of zone 80A. FIG. 3B shows that after the reset of zone 80A, data element 82B was written at the initial logical and physical address (1, 1) of zone 80B and overrode the data that was previously written at the initial logical and physical address (1, 1) of zone 80A (i.e., data element 82A). In addition, after the reset, and following the write to the initial logical and physical address (1, 1) of zone 80B, data element 84B was written at a subsequent logical and physical address (2, 2).

As such, FIGS. 3A and 3B show how in some typical HAMR-SMR type storage devices, the initial physical locations of a zone may be disproportionately written to more than other physical locations of the zone since subsequent write operations performed after a reset of the zone, always begin at the same the initial physical address. As a result, the initial physical locations of each zone of a typical HAMR-SMR type storage device may wear out or be damaged prematurely due to overexposure to heat that occurs with HAMR.

FIGS. 4A and 4B show zones 70A and 70B, which illustrate a single one of zones 70 of FIG. 1, respectively, before and after a reset. FIGS. 4A and 4B show that, in contrast to typical HAMR-SMR type storage devices, storage device 20 may remap the respective, initial logical address of each of zones 70 after a corresponding reset operation of that zone, as a way to minimize damage that may occur at the initial physical location of the zone due to subsequent HAMR operations being performed at the initial logical locations of the zone after each reset.

For example, FIG. 4A shows zone 70A of platter 60. Zone 70A includes data elements 86A and 88A. FIG. 4A illustrates that at an initial point in time, data element 86A was written at the initial logical and physical address (1,1) of zone 70A and that following the write to the initial logical and physical address (1,1), data element 88A was written at a subsequent logical and physical address (2,2).

Eventually, host 10 may command storage device 20 to reset zone 70A by providing a reset command to host interface module 32 of control module 30. Host interface module 32 may share the indication of the reset command with wear leveling module 34 so that wear leveling module 34 can update the information stored at data store 42 to be inline with the reset command. In order to evenly wear zone 70A, wear leveling module 34 of control module 30 may alter the information stored at data store 42 so as to remap the initial logical address of zone 70A to the next available location in zone 70A. In some examples, wear leveling module 34 may alter or adjust the write pointer of zone 70A to point to the initial logical location of zone 70A and the physical location of zone 70A that was most recently available to be written. In other words, rather than continue to use physical location 1 of zone 70A as the initial logical location of zone 70A, after reset, wear leveling module 34 may cause the initial logical address of zone 70B to correspond to physical location 3 which is the next-available physical address that was not previously written.

For example, FIG. 4B shows zone 70B, which corresponds to zone 70A of FIG. 4A after storage device 20 has performed a reset operation. FIG. 4B shows that, following the reset of zone 70A, host 10 may command storage device 20 to write data element 86B at the initial logical address of zone 70B. In response to the command to write data element 86B, storage device 20 used HAMR techniques to write data element 86B at initial logical and physical address (1, 3) of zone 70B. In this way, storage device 20 may avoid performing an additional HAMR operation at physical address 1 of zone 70B, and instead may perform the HAMR operation at new physical address of zone 70B (e.g., physical address 3) that was not written to previously. FIG. 4B further shows that in response to subsequent write commands, additional data element 88B was written at a subsequent logical and physical address (2, 4).

In some examples, when resetting one of zones 70, storage device 20 may assign the initial logical address of a zone to a next-available physical address of the zone prior to receiving the reset command. In other words, just prior to receiving the reset command from host 10, wear leveling module 34 may determine that physical address 3 of zone 70A is the next available physical address of zone 70A at which additional data can be written. In response to receiving the reset command, wear leveling module 34 may remap the initial logical address of zone 70B from physical address 1, to physical address 3, as a way to promote wear leveling within zone 70B.

In some examples, the physical address space at which initial data is written to a first region of the zone beginning at the initial physical address and the subsequent data is written to a second region of the zone beginning at the subsequent physical address, wherein the first and second regions are non-overlapping regions of the zone. Said differently, as shown in FIG. 4B, data elements 86B and 88B are written, after resetting the initial logical address, at a region of zone 70B that is adjacent to, but does not overlap with the physical areas of zone 70B at which data elements 86A and 86B were written.

Figure 5:
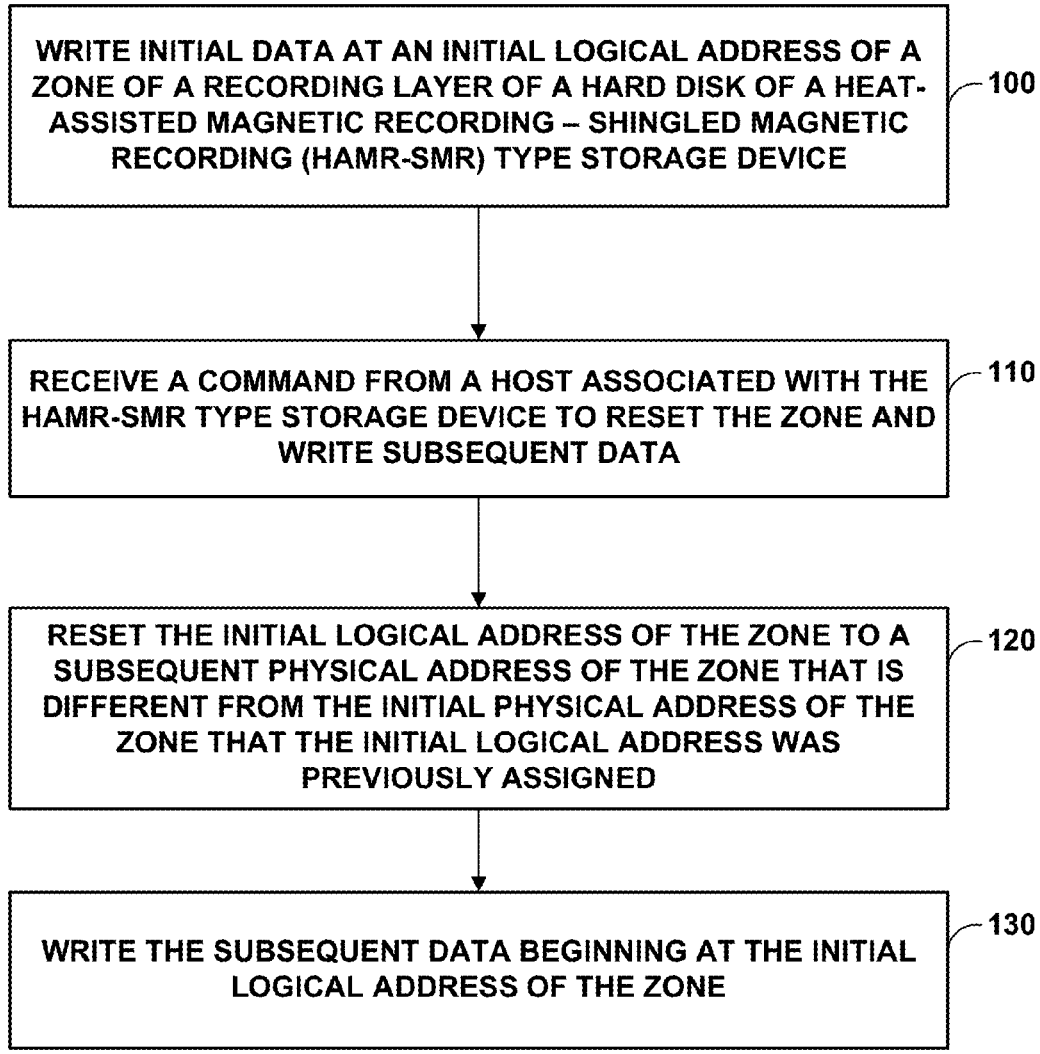
FIG. 5 is a flow diagram illustrating example operations of the example HAMR-SMR type storage device.

FIG. 5 is a flow diagram illustrating example operations of the example HAMR-SMR type storage device. The operations of FIG. 5 may be performed by control module, such as control module 30 of storage device 20 and are described below in the context of system 1 of FIG. 1, control module 30 of FIG. 2, and zones 70A and 70B of FIGS. 4A and 4B.

A control module may write initial data at an initial logical address of a zone of a recording layer of a hard disk of a heat-assisted magnetic recording type storage device (100). For example, control module 30 may receive instructions from host 10 to record some initial data at an initial logical address associated with zone 70A of platter 60. Wear leveling module 34 may translate the initial logical address into a physical logical address associated with zone 70A and cause arm assembly 38 to write the initial data to zone 70A. Arm assembly 38 may cause zone 70A to record data element 86A and 88A at (logical address, physical address) addresses (1, 1) and (2, 2) respectively.

The control module may receive a command from a host associated with the HAMR-SMR type storage device to resent the zone and write subsequent data (110). For example, host 10 may issue additional instructions or commands to storage device 20. The additional instructions may include a reset command to configure storage device 20 to "reset" or otherwise delete the initial data stored at zone 70A. The additional instructions may further include a write command to cause storage device 20 to write subsequent data that overrides the initial data at the initial logical address of zone 70A.

The control module may reset the initial logical address of the zone to a subsequent physical address of the zone that is different from the initial physical address of the zone that the initial logical address was previously assigned (120). For example, wear leveling module 34 may modify the information stored at data store 42 in response to the reset command from host 10 to cause the initial logical address of zone 70A to no longer coincide with physical address 1, but rather cause the initial logical address to coincide with physical address 2 (e.g., the next-available physical address that was not previously written to before the reset was received).

The control module may write the subsequent data beginning at the initial logical address of the zone (130). For example, wear leveling module 34 may cause arm assembly 38 to write the subsequent data to zone 70B beginning at the new, initial logical location, corresponding to physical address 3. Arm assembly 38 may cause zone 70B to record data element 86B and 88B at (logical address, physical address) addresses (1,3) and (2,4) respectively.

In some examples, storage device 20 may reset the initial logical address of a zone only after determining whether a size of the initial data satisfies or does not satisfy a threshold amount of data. In other words, given that a zone, as used herein, refers to a minimum amount of data that can be "reset" or otherwise deleted at any given time, storage device 20 may at times refrain from resetting the initial logical address of a zone unless the reset can be performed within a reasonably short amount of time. For example, the threshold amount of data may correspond to an amount of data that can be written by storage device during one revolution of platter 60 (e.g., on the order of one or more megabytes for a typical gigabyte or terabyte drive).

In other words, storage device 20 may reset the initial logical address of a zone in response to determining that a size of the initial data written to the zone prior to receiving the reset command does not satisfy a threshold amount of data (e.g., is less than the amount of data that can be written by storage device during one revolution of platter 60). And conversely, storage device 20 may refrain from resetting the initial logical address of a zone in response to determining that a size of the initial data written to the zone prior to receiving the reset command does satisfy the threshold amount of data (e.g., is greater than the amount of data that can be written by storage device during one revolution of platter 60).

In some examples, storage device 20 may reset the initial logical address of a zone by at least resetting the initial logical address of the zone to the subsequent physical address of the zone in response to determining that a next-available physical address of the zone is less than a threshold physical address for resetting the zone. For example, storage device 20 may determine the new initial logical address of a zone after reset and if the new initial logical address is "too high" or too close to the end of a logical block of addresses, storage device 20 may refrain from resetting the initial logical address of the zone and instead keep the initial logical address at the current, corresponding physical address. Conversely, storage device 20 may determine the new initial logical address of a zone after reset is not "too high" or too close to the end of a logical block of addresses, and storage device 20 may continue resetting the initial logical address of the zone to a new, available physical address.

Clause 1. A method comprising: writing, by a control module of a heat-assisted magnetic recording-shingled magnetic recording (HAMR-SMR) type storage device, initial data, wherein the initial data is written beginning at an initial logical address of a zone of a recording layer of the HAMR-SMR type storage device, wherein the initial logical address to an initial physical address of the zone; and responsive to receiving a command from a host associated with the HAMR-SMR type storage device to reset the zone and write subsequent data: resetting, by the control module, the initial logical address of the zone to a subsequent physical address of the zone; and after resetting the initial logical address, writing, by the control module, the subsequent data beginning at the initial logical address of the zone.

Clause 2. The method of clause 1, wherein the subsequent physical address of the zone is a next-available physical address of the zone prior to receiving the command.

Clause 3. The method of any of clauses 1-2, wherein resetting the initial logical address of the zone further comprises resetting the initial logical address of the zone to the subsequent physical address of the zone in response to determining that a size of the initial data does not satisfy a threshold amount of data.

Clause 4. The method of clause 3, wherein the threshold amount of data corresponds to an amount of data that can be written by the storage device during one revolution of the recording layer.

Clause 5. The method of any of clauses 3-4, wherein resetting the initial logical address of the zone further comprises refraining from resetting the initial logical address of the zone to the subsequent physical address of the zone in response to determining that the size of the initial data satisfies the threshold amount of data.

Clause 6. The method of any of clauses 1-5, wherein resetting the initial logical address of the zone further comprises resetting the initial logical address of the zone to the subsequent physical address of the zone in response to determining that a next-available physical address of the zone is less than a threshold physical address for resetting the zone.

Clause 7. The method of any of clauses 1-6, wherein the command is a first command and the subsequent physical address is a first subsequent physical address, the method further comprising: after receiving the first command and responsive to receiving a second command from the host to reset the zone and write additional data: resetting, by the control module, the initial logical address of the zone to a second subsequent physical address of the zone, wherein the second subsequent physical address of the zone is a next-available physical address of the zone prior to receiving the first command; and writing, by the control module, the additional data beginning at the initial logical address of the zone.

Clause 8. The method of any of clauses 1-7, wherein the zone is a sequentially written zone.

Clause 9. The method of any of clauses 1-8, wherein the initial data is written to a first region of the zone beginning at the initial physical address and the subsequent data is written to a second region of the zone beginning at the subsequent physical address, wherein the first and second regions are non-overlapping regions of the zone.

Clause 10. A heat-assisted magnetic recording-shingled magnetic recording (HAMR-SMR) type storage device comprising: a plurality of magnetic recording layers partitioned into one or more zones; an arm assembly that includes a head configured to write and read data at each of the one or more zones using HAMR techniques; and a control module that includes at least one processor configured to: receive initial data from a host; write the initial data beginning at an initial logical address of a particular zone of the one or more zones, wherein the initial logical address corresponds to an initial physical address of the particular zone; and responsive to receiving a command from the host to reset the zone and write subsequent data: reset the initial logical address of the particular zone to a subsequent physical address of the particular zone; and after resetting the initial logical address, write the subsequent data beginning at the initial logical address of the particular zone.

Clause 11. The HAMR-SMR type storage device of clause 10, wherein the at least one processor is further configured to write the initial data to a first region of the zone beginning at the initial physical address and write the subsequent data to a second region of the zone beginning at the subsequent physical address.

Clause 12. The HAMR-SMR type storage device of clause 11, wherein the first and second regions are non-overlapping regions of the zone Clause 13. The HAMR-SMR type storage device of any of clauses 10-12, wherein the control module is configured to perform HAMR and shingled magnetic recording (SMR) within each of the one or more zones, and each of the one or more zones is a logical block address (LBA) band.

Clause 14. The HAMR-SMR type storage device of any of clauses 10-13, wherein each of the one or more zones corresponds to a minimum amount of area of the recording layer that can be reset by the storage device at a single time.

Clause 15. The HAMR-SMR type storage device of any of clauses 10-14, wherein the at least one processor is configured to reset the initial logical address of the zone by at least resetting the initial logical address of the zone to the subsequent physical address of the zone in response to determining that a size of the initial data does not satisfy a threshold amount of data.

Clause 16. The HAMR-SMR type storage device of any of clauses 10-15, wherein the at least one processor is configured to reset the initial logical address of the zone by at least resetting the initial logical address of the zone to the subsequent physical address of the zone in response to determining that a next-available physical address of the zone is less than a threshold physical address for resetting the zone.

Clause 17. A system comprising: means for writing initial data beginning at an initial logical address of a zone of a magnetic recording layer of a heat-assisted magnetic recording-shingled magnetic recording (HAMR-SMR) type storage device, wherein the initial logical block address corresponds to an initial physical address of the zone; means for receiving a command from a host associated with the HAMR-SMR type storage device to reset the zone and write subsequent data; and responsive to receiving the command: means for resetting the initial logical block address of the zone to a subsequent physical address of the zone; and means for writing the subsequent data beginning at the initial logical block address of the zone after resetting the initial logical address.

Clause 18. The system of clause 17, wherein the subsequent physical address of the zone is a next-available physical address of the zone prior to receiving the command.

Clause 19. The system of any of clauses 17-18, wherein the means for resetting the initial logical block address of the zone further comprises means for resetting the initial logical address of the zone to the subsequent physical address of the zone in response to determining that a size of the initial data does not satisfy a threshold amount of data.

Clause 20. The system of clause 19, wherein the threshold amount of data corresponds to an amount of data that can be written by the HAMR-SMR type storage device during one revolution of the magnetic recording layer.

Clause 21. A system comprising means for performing any of the methods of clauses 1-10.

Clause 22. A storage device comprising at least one processor and at least one module executable by the at least one processor and configured to perform any of the methods of clauses 1-10.

Various examples have been described. These and other examples are within the scope of the following claims.

What is claimed is:

1. A method comprising:
    writing, by a control module of a heat-assisted magnetic recording-shingled magnetic recording (HAMR-SMR) type storage device, initial data, wherein the initial data is written beginning at an initial logical address of a zone of a recording layer of the HAMR-SMR type storage device, wherein the initial logical address to an initial physical address of the zone; and
    responsive to receiving a command from a host associated with the HAMR-SMR type storage device to reset the zone and write subsequent data:
        resetting, by the control module, the initial logical address of the zone to a subsequent physical address of the zone; and
        after resetting the initial logical address, writing, by the control module, the subsequent data beginning at the initial logical address of the zone.

2. The method of claim 1, wherein the subsequent physical address of the zone is a next-available physical address of the zone prior to receiving the command.

3. The method of claim 1, wherein resetting the initial logical address of the zone further comprises resetting the initial logical address of the zone to the subsequent physical address of the zone in response to determining that a size of the initial data does not satisfy a threshold amount of data.

4. The method of claim 3, wherein the threshold amount of data corresponds to an amount of data that can be written by the storage device during one revolution of the recording layer.

5. The method of claim 3, wherein resetting the initial logical address of the zone further comprises refraining from resetting the initial logical address of the zone to the subsequent physical address of the zone in response to determining that the size of the initial data satisfies the threshold amount of data.

6. The method of claim 1, wherein resetting the initial logical address of the zone further comprises resetting the initial logical address of the zone to the subsequent physical address of the zone in response to determining that a next-available physical address of the zone is less than a threshold physical address for resetting the zone.

7. The method of claim 1, wherein the command is a first command and the subsequent physical address is a first subsequent physical address, the method further comprising:
    after receiving the first command and responsive to receiving a second command from the host to reset the zone and write additional data:
        resetting, by the control module, the initial logical address of the zone to a second subsequent physical address of the zone, wherein the second subsequent physical address of the zone is a next-available physical address of the zone prior to receiving the first command; and
        writing, by the control module, the additional data beginning at the initial logical address of the zone.

8. The method of claim 1, wherein the zone is a sequentially written zone.

9. The method of claim 1, wherein the initial data is written to a first region of the zone beginning at the initial physical address and the subsequent data is written to a second region of the zone beginning at the subsequent physical address, wherein the first and second regions are non-overlapping regions of the zone.

10. A heat-assisted magnetic recording-shingled magnetic recording (HAMR-SMR) type storage device comprising:
   a plurality of magnetic recording layers partitioned into one or more zones;
   an arm assembly that includes a head configured to write and read data at each of the one or more zones using HAMR techniques; and
   a control module that includes at least one processor configured to:
      receive initial data from a host;
      write the initial data beginning at an initial logical address of a particular zone of the one or more zones, wherein the initial logical address corresponds to an initial physical address of the particular zone; and
      responsive to receiving a command from the host to reset the zone and write subsequent data:
         reset the initial logical address of the particular zone to a subsequent physical address of the particular zone; and
         after resetting the initial logical address, write the subsequent data beginning at the initial logical address of the particular zone.

11. The HAMR-SMR type storage device of claim 10, wherein the at least one processor is further configured to write the initial data to a first region of the zone beginning at the initial physical address and write the subsequent data to a second region of the zone beginning at the subsequent physical address.

12. The HAMR-SMR type storage device of claim 11, wherein the first and second regions are non-overlapping regions of the zone.

13. The HAMR-SMR type storage device of claim 10, wherein the control module is configured to perform HAMR and shingled magnetic recording (SMR) within each of the one or more zones, and each of the one or more zones is a logical block address (LBA) band.

14. The HAMR-SMR type storage device of claim 10, wherein each of the one or more zones corresponds to a minimum amount of area of the recording layer that can be reset by the storage device at a single time.

15. The HAMR-SMR type storage device of claim 10, wherein the at least one processor is configured to reset the initial logical address of the zone by at least resetting the initial logical address of the zone to the subsequent physical address of the zone in response to determining that a size of the initial data does not satisfy a threshold amount of data.

16. The HAMR-SMR type storage device of claim 10, wherein the at least one processor is configured to reset the initial logical address of the zone by at least resetting the initial logical address of the zone to the subsequent physical address of the zone in response to determining that a next-available physical address of the zone is less than a threshold physical address for resetting the zone.

17. A system comprising:
   means for writing initial data beginning at an initial logical address of a zone of a magnetic recording layer of a heat-assisted magnetic recording-shingled magnetic recording (HAMR-SMR) type storage device, wherein the initial logical block address corresponds to an initial physical address of the zone;
   means for receiving a command from a host associated with the HAMR-SMR type storage device to reset the zone and write subsequent data; and
   means for responsive to receiving the command:
      resetting the initial logical block address of the zone to a subsequent physical address of the zone; and
      writing the subsequent data beginning at the initial logical block address of the zone after resetting the initial logical address.

18. The system of claim 17, wherein the subsequent physical address of the zone is a next-available physical address of the zone prior to receiving the command.

19. The system of claim 17, wherein the means for resetting the initial logical block address of the zone further comprises means for resetting the initial logical address of the zone to the subsequent physical address of the zone in response to determining that a size of the initial data does not satisfy a threshold amount of data.

20. The system of claim 19, wherein the threshold amount of data corresponds to an amount of data that can be written by the HAMR-SMR type storage device during one revolution of the magnetic recording layer.

* * * * *